(12) United States Patent
Kim et al.

(10) Patent No.: US 7,753,159 B2
(45) Date of Patent: Jul. 13, 2010

(54) EXTERIOR AIR-BAG FOR VEHICLES

(75) Inventors: Yong Sun Kim, Namyangju-si (KR); Jun Yeol Choi, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 12/478,592

(22) Filed: Jun. 4, 2009

(65) Prior Publication Data

US 2010/0059972 A1    Mar. 11, 2010

(30) Foreign Application Priority Data

Sep. 9, 2008    (KR)    .............. 10-2008-0088615

(51) Int. Cl.
*B60K 28/10* (2006.01)
(52) U.S. Cl. ............................................. 180/274
(58) Field of Classification Search .......... 180/271, 180/274, 282; 280/735
See application file for complete search history.

(56) References Cited

U.S. PATENT DOCUMENTS

| 3,588,142 | A | * | 6/1971 | Gorman | 280/736 |
|---|---|---|---|---|---|
| 3,822,076 | A | * | 7/1974 | Mercier et al. | 293/107 |
| 4,176,858 | A | * | 12/1979 | Kornhauser | 280/734 |
| 4,215,878 | A | * | 8/1980 | Hirbod | 280/737 |
| 5,646,613 | A | * | 7/1997 | Cho | 340/903 |
| 5,732,785 | A | * | 3/1998 | Ran et al. | 180/271 |
| 6,106,038 | A | * | 8/2000 | Dreher | 293/118 |
| 6,270,130 | B1 | * | 8/2001 | Kim | 293/107 |
| 6,883,631 | B2 | * | 4/2005 | Hu et al. | 180/274 |
| 6,923,483 | B2 | * | 8/2005 | Curry et al. | 293/107 |
| 7,232,001 | B2 | * | 6/2007 | Hakki et al. | 180/271 |
| 2004/0074688 | A1 | * | 4/2004 | Hashimoto et al. | 180/271 |
| 2006/0169517 | A1 | * | 8/2006 | Mishra | 180/274 |
| 2007/0114090 | A1 | * | 5/2007 | Okamoto et al. | 180/274 |

* cited by examiner

*Primary Examiner*—Paul N Dickson
*Assistant Examiner*—Robert A Coker
(74) *Attorney, Agent, or Firm*—Morgan, Lewis & Bockius LLP

(57) ABSTRACT

An exterior airbag for vehicles includes an airbag cushion deployed forwards from the front surface of a vehicle. The exterior airbag may include a plurality of airbag housings mounted to a bumper of a vehicle, a plurality of airbag cushions received in respective airbag housings so as to be deployed forwards from a front surface of the bumper, a plurality of partitioned chambers defined in each of the airbag cushions along a longitudinal direction of the airbag cushion, with a plurality of gas supply holes formed in respective partitioned chambers so as to evenly supply airbag gas to the chambers, and at least an inflator providing a airbag gas to each of the airbag cushions through the gas supply holes.

9 Claims, 6 Drawing Sheets

EXTERIOR AIR-BAG FOR VEHICLES

CROSS-REFERENCE TO RELATED APPLICATION

The present application claims priority to Korean Patent Application Number 10-2008-0088615, filed on Sep. 9, 2008, the entire contents of which is incorporated herein for all purposes by this reference.

BACKGROUND OF THE INVENTION

1. Field of the Invention

The present invention relates to an exterior airbag for vehicles, which has an airbag cushion configured to be quickly and reliably deployed forwards in the front of a vehicle.

2. Description of Related Art

Generally, a vehicle is provided with a variety of safety devices for protecting a driver and passengers when an unexpected accident of the vehicle occurs. A representative example of the safety devices is an airbag, which can protect a driver or a passenger who is seated in a front passenger seat of a vehicle.

The airbag is configured such that, when a vehicle collides with another vehicle or an object, pressurized gas is instantaneously injected into an airbag cushion in response to collision shock and the airbag cushion is quickly inflated by the pressurized gas, thus covering the front part of a driver or a passenger seated in the front passenger seat of the vehicle and protecting the driver or the passenger from a windshield glass or an object placed in front of the vehicle.

Conventional airbags are interior airbags, which are installed inside the passenger compartment of a vehicle and are deployed inside the passenger compartment so as to protect passengers seating inside the passenger compartment. However, the interior airbags cannot protect vehicle bodies, which collide with each other, or persons outside the colliding vehicle which is equipped with the interior airbags. Described in brief, the interior airbags cannot protect vehicle bodies and people outside colliding vehicles.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an exterior airbag for vehicles, which has an airbag cushion configured to be quickly and reliably deployed forwards in the front of a vehicle by realizing smooth flowing of airbag gas in the airbag cushion.

In an aspect of the present invention, the exterior airbag for vehicles may include a plurality of airbag housings mounted to a bumper of a vehicle, a plurality of airbag cushions received in respective airbag housings so as to be deployed forwards from a front surface of the bumper, a plurality of partitioned chambers defined in each of the airbag cushions along a longitudinal direction of the airbag cushion, with a plurality of gas supply holes formed in respective partitioned chambers so as to evenly supply airbag gas to the chambers, and at least an inflator providing a airbag gas to each of the airbag cushions through the gas supply holes.

Each of the airbag cushions may be provided with a gas guide passage, which longitudinally extends through each of the airbag cushions, with a gas distributor inserted into the gas guide passage and connected to the inflator and provided with a plurality of gas distributing holes corresponding to the gas supply holes.

The partitioned chambers may be divided in each of the airbag cushions by a plurality of partition walls arranged in the airbag cushion at intervals along a longitudinal direction, with a gas control hole formed in each of the partition walls for controlling a flow of the airbag gas between the partitioned chambers.

The gas supply holes may have diameters, which are gradually enlarged in a direction, along which the airbag gas flows in the airbag cushion.

The gas distributing holes may have diameters, which are gradually enlarged in a direction, along which the airbag gas flows in the airbag cushion.

The gas guide passage may be provided at an end thereof with an end hole for supplying the airbag gas to a terminal end of the airbag cushion, with a deploying guide provided in the end of the gas guide passage so as to connect an end of the gas distributor to the end hole.

When the airbag cushions are fully deployed, neighboring sides of the airbag cushions may overlap each other, thus forming an overlapping part, so that the airbag cushions encircle the front surface of the bumper.

In another aspect of the present invention, the airbag housings may be provided in opposite sides of the bumper, and the airbag cushions may include a first airbag cushion received in the airbag housing provided in a first end of the bumper such that a side of the first airbag cushion covers a central area of the front surface of the bumper when the airbag cushions are deployed, and a second airbag cushion received in the airbag housing provided in a second end of the bumper such that a side of the second airbag cushion covers the side of the first airbag cushion when the airbag cushions are deployed.

Each of the first and second airbag cushions may be provided with embossments protruding forwards from a front of the vehicle, and, when the first and second airbag cushions are deployed, the neighboring sides thereof form inclined surfaces, which face each other and form the overlapping part.

In further another aspect of the present invention, the exterior airbag for vehicles may include a sensing unit for sensing a speed and a distance of a driver's own vehicle and a speed and a distance of an object and outputting sensing signals, and a control unit for determining using the sensing signals whether the driver's own vehicle is in a state just before a collision with the object or not and outputting airbag cushion deploying signals, wherein the control unit outputs the airbag cushion deploying signals with a time interval such that a rear one of the airbag cushions can be deployed prior to a front one of the airbag cushions, which forms the overlapping part in cooperation with the rear airbag cushion.

The exterior airbag for vehicles according to the present invention is advantageous in that airbag gas can be evenly supplied into respective partitioned chambers defined in each of the airbag cushions, so that the airbag cushions can be evenly and quickly deployed forwards.

Another advantage of the present invention resides in that airbag gas can quickly reach an end of each of the airbag cushions through a deploying guide, so that the airbag cushions can be evenly and quickly deployed forwards.

Further, the exterior airbag for vehicles according to the present invention is configured such that the airbag cushions, provided in opposite ends of a vehicle bumper, are differentially deployed with a time interval, so that, when the airbag cushions are deployed forwards, the airbag cushions can form desired shapes in the overlapping parts thereof, thus realizing a stable and reliable deployment thereof.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

As shown in FIGS. 1 through 6, an exterior airbag for vehicles according to various embodiments of the present invention is characterized in that an airbag cushion 200 can be evenly and quickly deployed forwards by a partitioned chamber 201 provided in the airbag-cushion 200 so as to evenly guide airbag gas into the airbag cushion 200.

In order to realize the object of the present invention, the exterior airbag for vehicles includes a plurality of airbag housings 300 mounted to a vehicle bumper 700, a plurality of airbag cushions 200 received in respective airbag housings 300, a partitioned chamber 201 defined in each of the airbag cushions 200 along a longitudinal direction of the cushion 200, and an inflator 100 for providing a deploying force to each of the airbag cushions 200.

Figure 1:
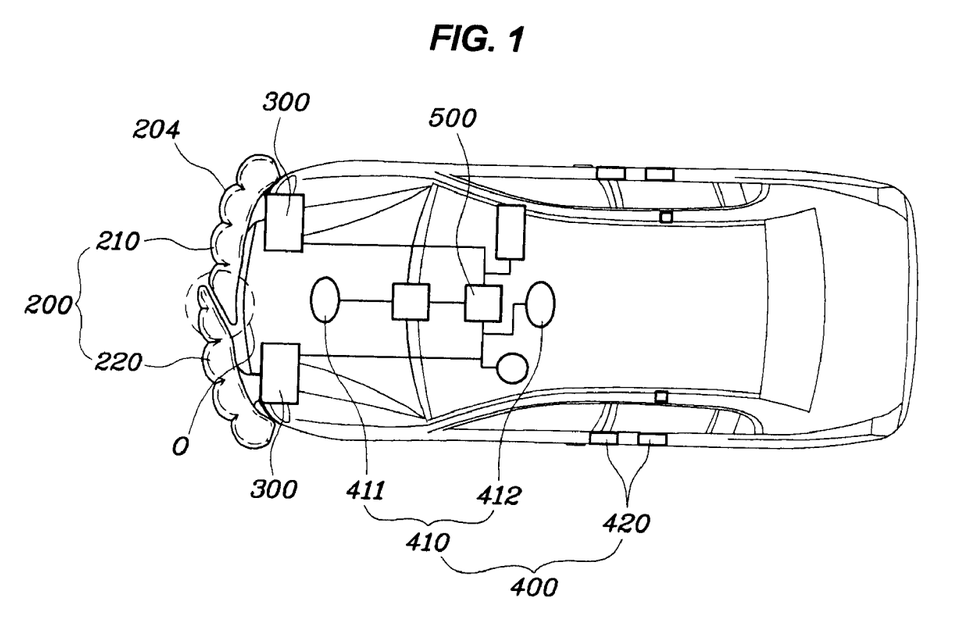
FIG. 1 is a view illustrating the construction of an exemplary exterior airbag for vehicles according to the present invention.
Figure 2:
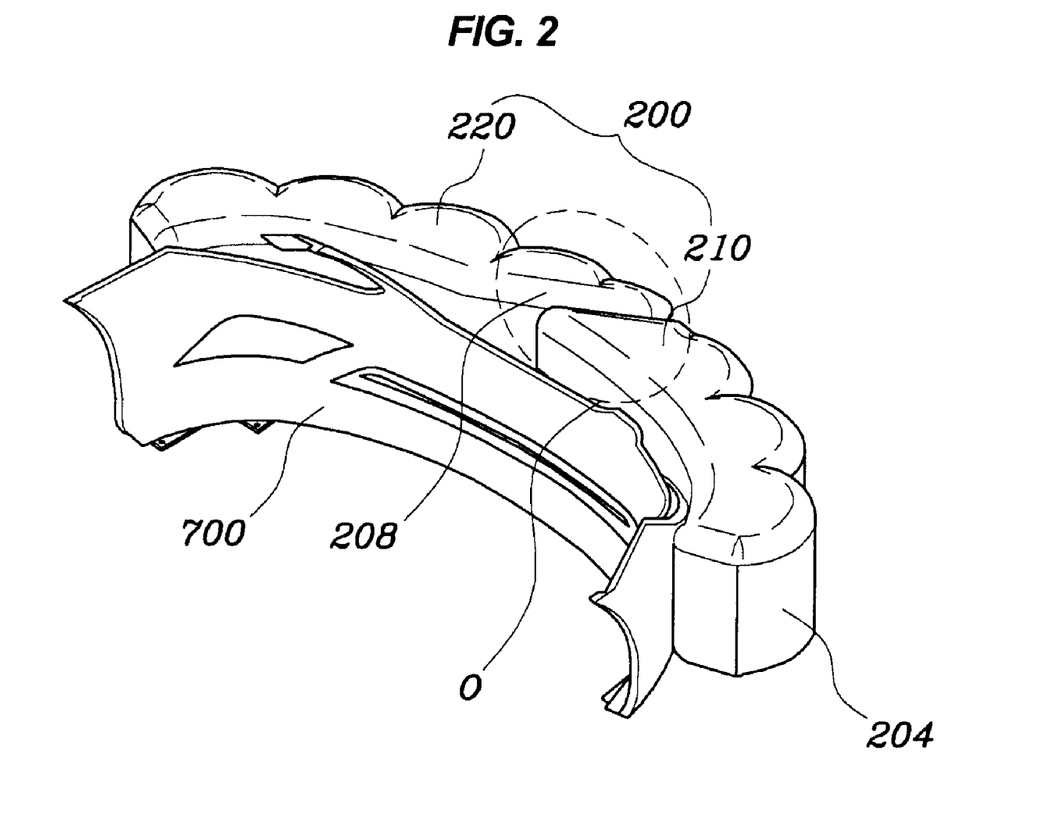
FIG. 2 is an enlarged view illustrating an airbag cushion of the exemplary exterior airbag for vehicles according to the present invention.

Described in detail, the airbag cushions 200 are received in respective airbag housings 300 and are configured such that, when the cushions 200 are fully inflated, they completely surround the front surface of a vehicle bumper. The partitioned chamber 201 is defined in each of the airbag cushions 200 along a longitudinal direction.

Figure 3:
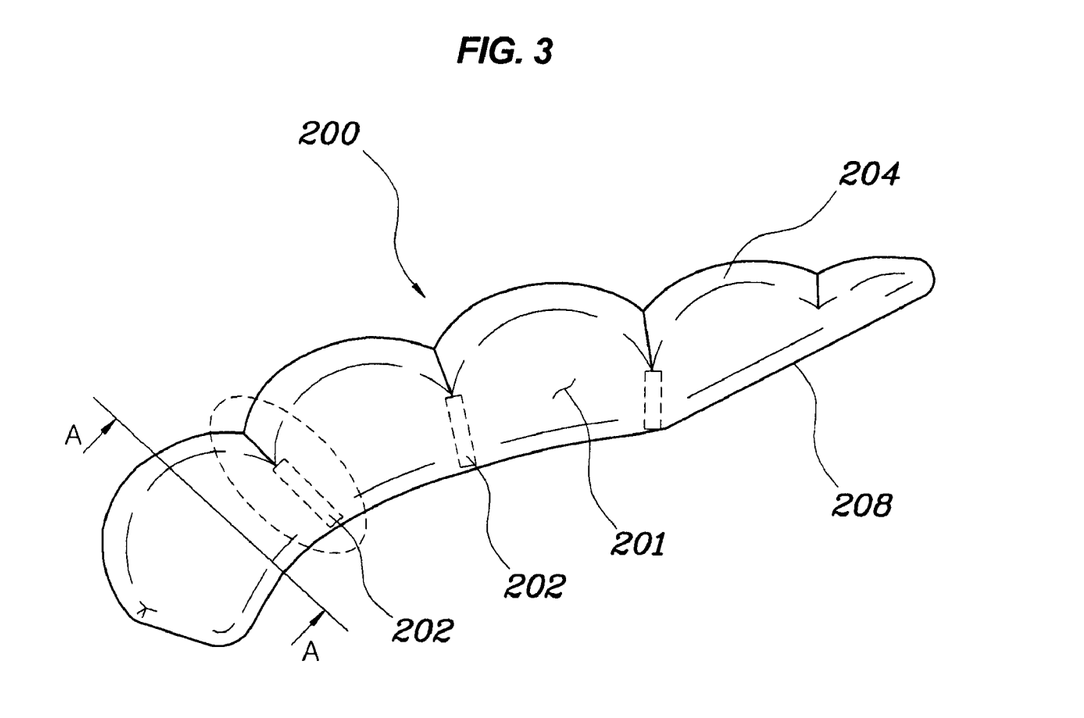
FIG. 3 is a plan view illustrating partition walls provided in the exemplary exterior airbag for vehicles according to the present invention.
Figure 4:
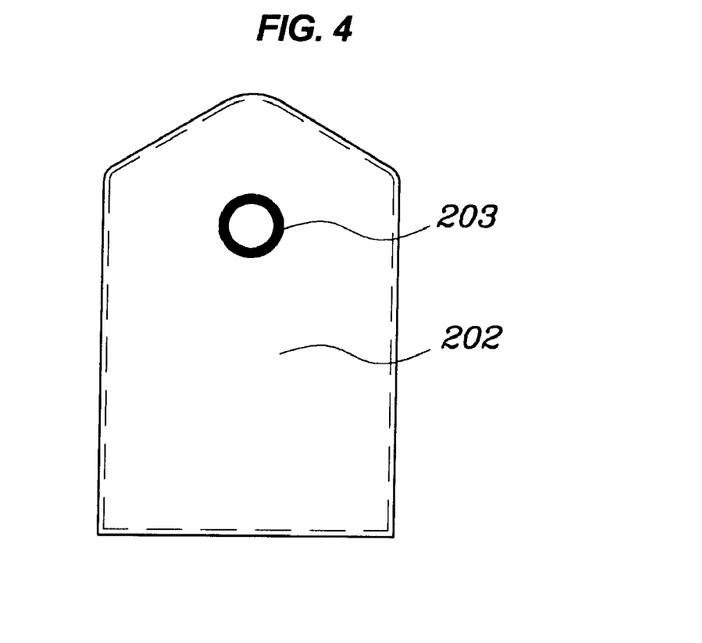
FIG. 4 is a sectional view taken along line A-A of FIG. 3.

The partitioned chamber 201 is a space, in which airbag gas supplied from the inflator 100 is charged. The partitioned chamber 201 includes a plurality of chambers, which are sequentially defined in each of the airbag cushions 200 along a longitudinal direction, with partition walls 202 provided between them. The partition walls 202 function to maintain a desired shape of each of the airbag cushions 200 when the airbag cushions 200 are deployed, and define the chambers 201 in the airbag cushion 200. The partition walls 202 are provided with respective gas control holes 203 for realizing a flow of the airbag gas between the chambers 201. In other words, when an excessive amount of airbag gas is supplied into a chamber 201, the gas control holes 203 allows the airbag gas to flow from the chamber 201 to other chambers 201.

Figure 5A:
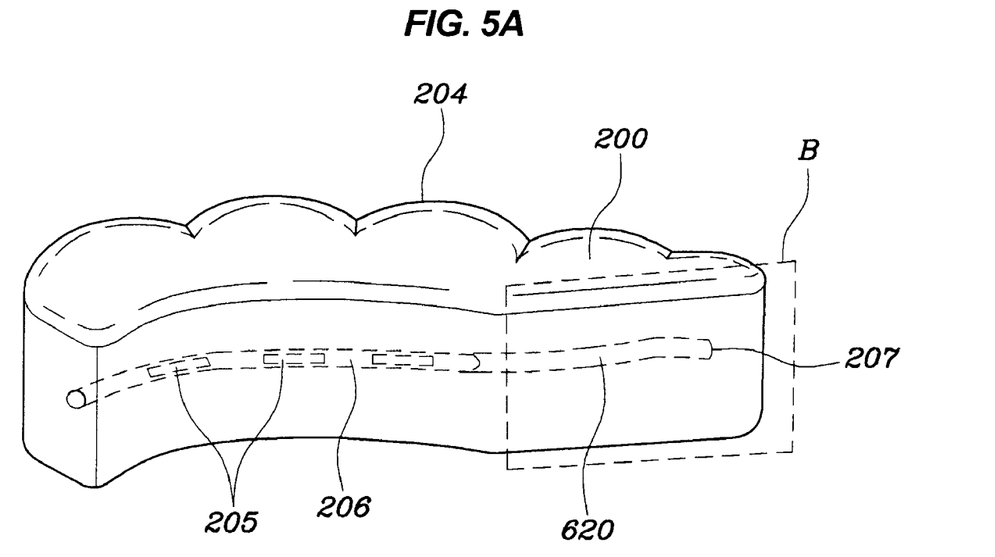
FIG. 5A is a view illustrating a guide hole provided in the exemplary exterior airbag for vehicles according to the present invention.
Figure 5B:
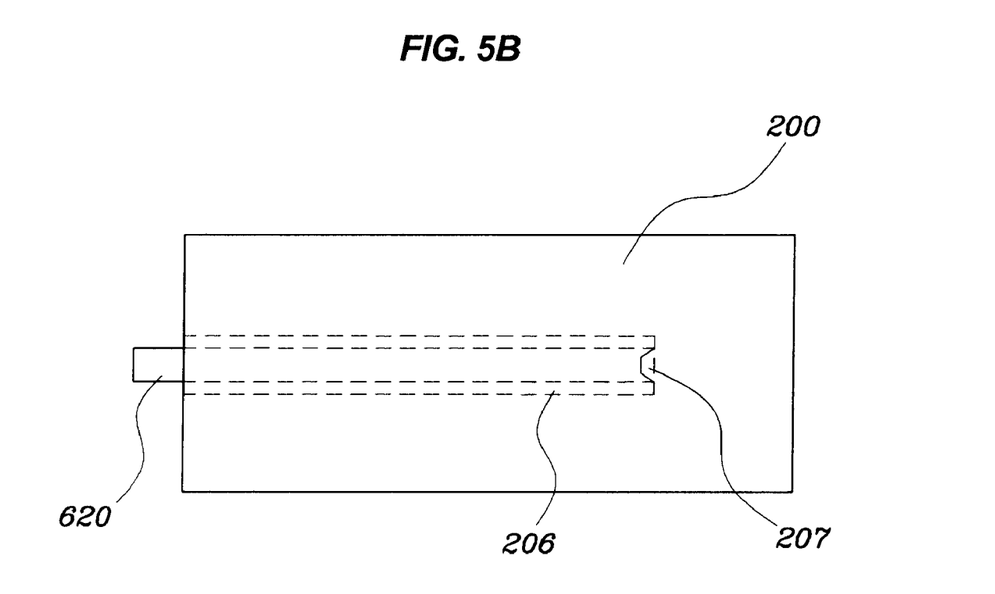
FIG. 5B is a sectional view taken along line B-B of FIG. 5A.

The partitioned chambers 201 are provided with respective gas supply holes 205, through which airbag gas are supplied into respective chambers 201. The gas supply holes 205 are guide holes, through which the airbag gas supplied from the inflator 100 is introduced into respective chambers 201. The gas supply holes 205 communicate with a gas guide passage 206, which extends through each of the airbag cushions 200 along a longitudinal direction. In other words, the airbag gas supplied from the inflator 100 flows through the gas guide passage 206 and, in the above state, the gas can be introduced into the partitioned chambers 201 through respective gas supply holes 205.

Figure 6:
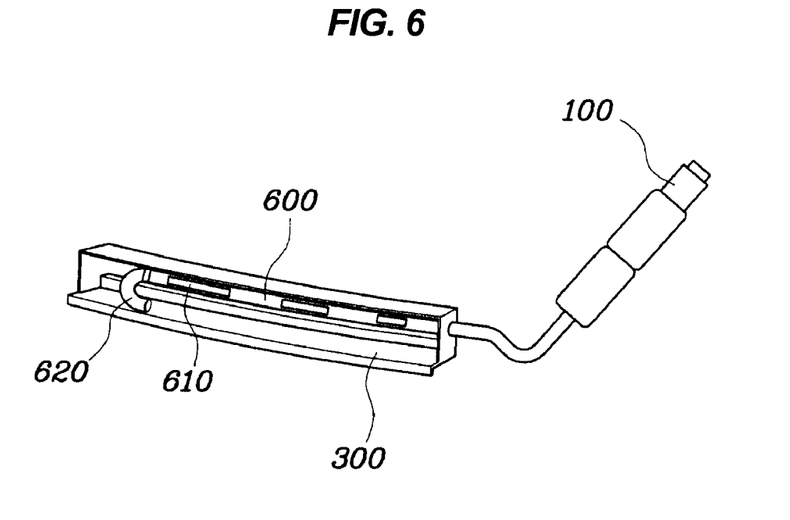
FIG. 6 is a view illustrating the construction of a gas distributor of the exemplary exterior airbag for vehicles according to the present invention.

A gas distributor 600 may be inserted into the gas guide passage 206. The gas distributor 600 functions to appropriately distribute airbag gas, supplied from the inflator 100, to the partitioned chambers 201. The gas distributor 600 has a plurality of gas distributing holes 610, through which airbag gas can flow. The gas distributing holes 610 are formed at locations corresponding to the gas supply holes 205 of the partitioned chambers 201 and it is preferred that the gas distributing holes 610 be designed to have different diameters such that the diameters of the gas distributing holes 610 are gradually enlarged in a direction toward a longitudinal end of the airbag cushion 200.

In other words, the diameter of a gas distributing hole 610, which is formed at a location far from the inflator 100, is larger than the diameter of another gas distributing hole 610, which is formed at a location close to the inflator 100. If the gas distributing holes 610 are designed to have the same diameters, the gas distributing holes 610 may supply different amounts of airbag gas into respective partitioned chambers 201 due to that fact that the gas supply pressure at a location close to the inflator 100 is higher than that of a location far from the airbag gas. However, the gas distributing holes 610 having different diameters according to various embodiments of the present invention can evenly distribute gas pressure to respective partitioned chambers 201, thus realizing a synchronous deployment of the chambers 201 in each of the airbag cushions 200.

In the above-mentioned embodiments, an even distribution of gas pressure to the partitioned chambers 201 is realized by respective gas distributing holes 610 having different diameters. However, it should be understood that the even distribution of gas pressure to the partitioned chambers 201 may be realized by designing the gas supply holes 205 to have different diameters such that the diameter of a gas supply hole 205 formed at a location far from the inflator 100 is larger than that of another gas supply hole 205 formed at a location close to the inflator 100.

Further, a deploying guide 620 may be provided in the gas guide passage 206 for guiding the airbag gas to a terminal end of the airbag cushion 200. The deploying guide 620 is coupled to an end of the gas distributor 600 through a clip and communicates with an end hole 207 of the airbag cushion 200. It is preferred that the deploying guide 620 be made of a flexible material, such as a fabric or vinyl, so as to allow the airbag cushion 200 to be easily bent, and be mounted to the airbag cushion 200 through sewing, bonding or taping. Due to the deploying guide 620, the airbag gas supplied from the gas distributor 600 can easily reach the terminal end of the airbag cushion 200, so that the airbag cushion 200 can be evenly and quickly deployed.

The airbag cushions 200 are configured such that, when they are fully deployed forwards, an overlapping part O is formed by the neighboring sides of the cushions 200 and the deployed cushions 200 can cover the entire part of the front surface of the vehicle bumper 700.

In order to realize the configuration, the airbag cushions 200 include a first airbag cushion 210, which is provided in a first end of the bumper 700 and is configured such that a side thereof covers the center of the front surface of the bumper 700 when it is deployed, and a second airbag cushion 220, which is provided in a second end of the bumper 700 and is configured such that a side thereof covers the side of the first airbag cushion 210 when it is deployed.

When the first and second airbag cushions 210 and 220 are fully deployed, the neighboring sides thereof form respective diagonal inclined surfaces 208, which face each other to form the overlapping part O. When the airbag cushions 200 are fully deployed forwards, the overlapping part O is located in front of the vehicle, thus efficiently absorbing shock generated from a head-on collision of vehicles. Described in detail, when the airbag cushions 200 are fully deployed, the side of the first airbag cushion 210 covers the central area of the front end of the vehicle and, at the same time, the side of the second airbag cushion 220 covers the side of the first airbag cushion 210, so that passengers of vehicles can be safely protected from a head-on collision of vehicles.

A plurality of embossments 204 are formed in each of the first and second airbag cushions 210 and 220 such that the embossments 204 protrude forwards from the front of the vehicle. The embossments 204 function to increase the collision shock absorbing effect and efficiently respond a collision on head corners of vehicles in addition to a head-on collision of vehicles.

The deployment of the airbag cushion 200, which is executed just before the vehicle collides with another vehicle or an object, is performed through operation of both a sensing unit 400 and the control unit 500.

Described in detail, the sensing unit 400 senses the speed and distance of a driver's own vehicle and the speed and distance of an object on a road, and outputs sensing signals to the control unit 500. To realize the above-mentioned function, the sensing unit 400 includes an object sensor 410 for sensing the speed and distance of the object, and a driver's own vehicle sensor 420 for sensing the speed and distance of the driver's own vehicle.

Here, the object sensor 410 may use a radar sensor 411 capable of sensing the speed and distance of an object before a collision and a camera sensor 412 capable of capturing the image of the object. The driver's own vehicle sensor 420 may use a speed sensor, a steering angle sensor, a wheel speed sensor and a G-sensor (gravity sensor) capable of sensing the speed and distance of the driver's own vehicle.

In response to sensing signals output from the sensing unit 400, the control unit 500 determines using the sensing signals whether the driver's own vehicle is in a state just before a collision or not. When it is determined that the driver's own vehicle is in a state just before a collision, the control unit 500 outputs deploying signals to the inflators 100, thus letting the airbag cushions 200 be deployed forwards from the front surface of the vehicle. In the above state, when the relative speed between the driver's own vehicle and the object is equal to or higher than a reference value and the distance between the driver's own vehicle and the object is equal to or lower than a reference value, the control unit 500 determines that the driver's own vehicle is in a state just before a collision with the object, thus outputting deploying signals to the inflators 100.

Particularly, the control unit 500 is programmed to preset a predetermined time interval in TFT (Time To Fire) setting such that the control unit 500 can output a deploying signal so as to let the first airbag cushion 210 be deployed prior to the second airbag cushion 220, which forms the overlapping part O in cooperation with the first airbag cushion 210.

Described in detail, in various embodiments, the control unit 500 outputs a deploying signal such that the first airbag cushion 210 can be deployed prior to the second airbag cushion 220. Thus, the first airbag cushion 210, which is deployed prior to the second airbag cushion 220, forms a cushion having a predetermined shape on the central area of the front surface of the vehicle bumper 700 and, thereafter, the second airbag cushion 220 is deployed so that the two airbag cushions 200 form a cushion having a stable shape on the front surface of the vehicle bumper 700.

Figure 7:
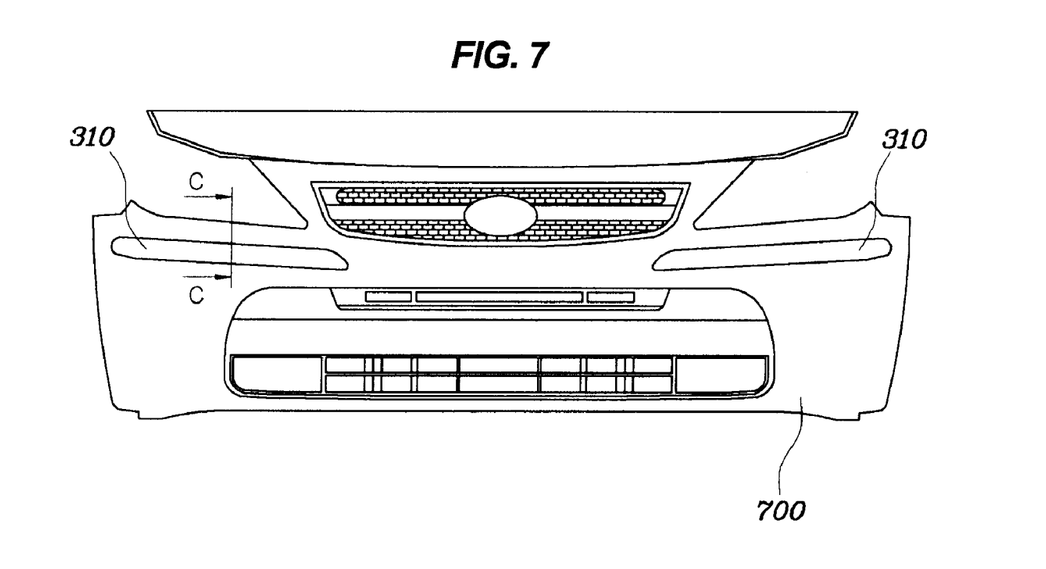
FIG. 7 is a front view illustrating a vehicle bumper equipped with the exemplary exterior airbag according to the present invention.
Figure 8:
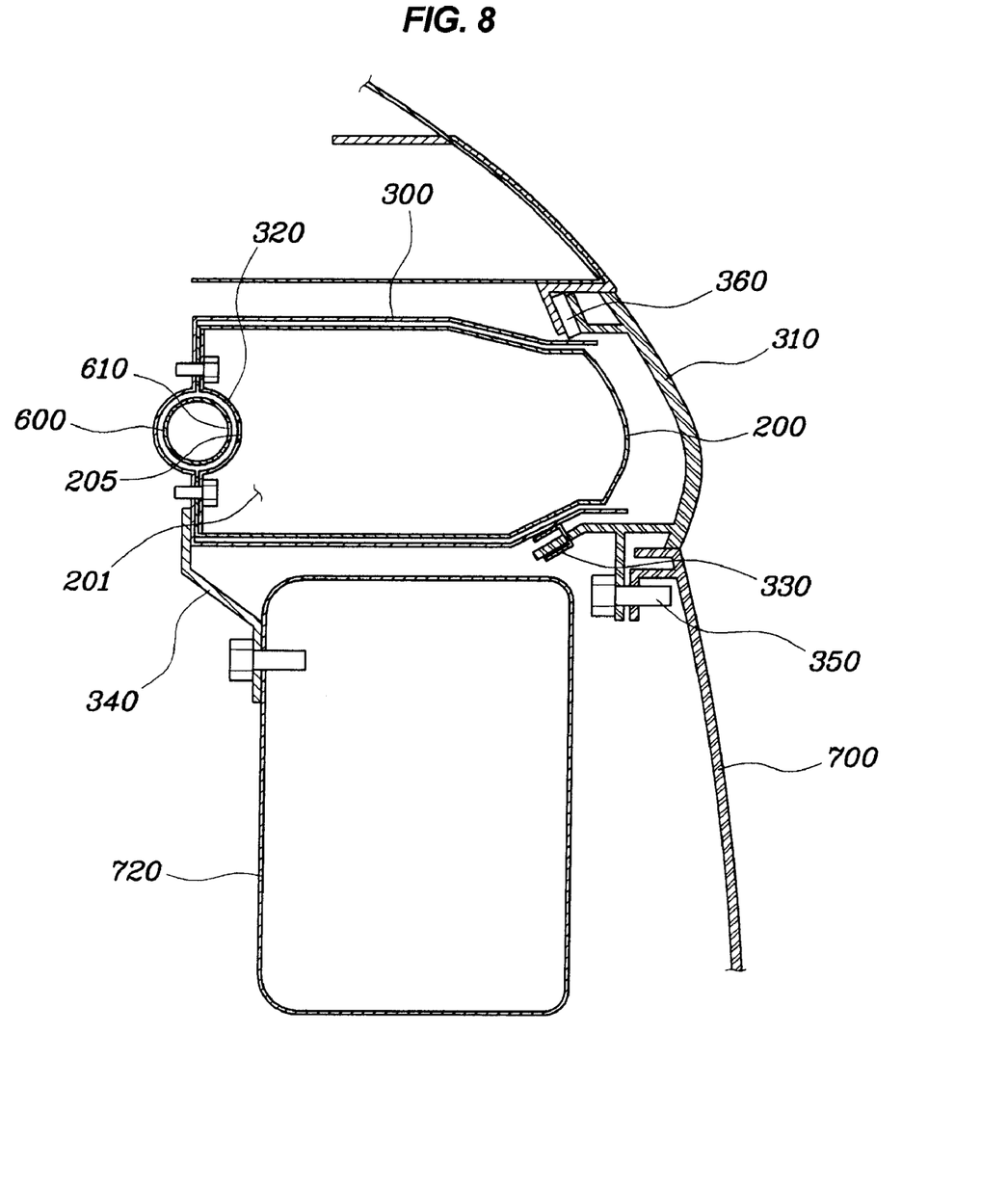
FIG. 8 is a sectional view taken along line C-C of FIG. 7.

As shown in FIGS. 7 and 8, the airbag cushions 200 are installed in the vehicle bumper 700 by respective airbag housings 300. Each of the airbag housings 300, which receive respective airbag cushions 200 therein, is mounted to a bumper back beam 720 through a mounting bracket 340.

Further, each of the airbag housings 300 is provided with an airbag door 310, which is opened when an associated airbag cushion 200 is deployed forwards from the airbag housing 300. The airbag door 310 is mounted at the upper end thereof to the vehicle bumper 700 using a double-sided adhesive material 360 or a bolt. The lower end of the airbag door 310 is coupled to the airbag housing 300 using a clip 330 and is also locked to the vehicle bumper 700 using a locking bolt 350. When the airbag cushion 200 is inflated, the upper end of the airbag door 310 is separated from the vehicle bumper 700 due to pressure of the inflated airbag cushion 200 and, at the same time, the clip 330 is separated from the airbag housing 300 so that the airbag door 310 is suspended from the locking bolt 350 of the vehicle bumper 700. In other words, when the airbag cushion 200 is inflated, the airbag housing 300 is opened and the airbag cushion 200 is deployed forwards from the vehicle bumper 700 through the opening of the airbag housing 300 so that the cushion 200 can absorb collision shock.

Further, an inflator 100 is connected to each of the airbag housings 300 so as to supply airbag gas to the airbag cushion 200. The inflator 100 is mounted to a wheel side panel of the vehicle and is exploded in response to a deploying signal output from the control unit 500 and supplies airbag gas under pressure to the airbag cushion 200. In the above state, the airbag gas under pressure from the inflator 100 is supplied to the partitioned chambers 201 through the gas distributor 600.

The above-mentioned operation of the present invention will be described in more detail as follows.

The sensing unit 400 senses the speed and distance of an object using the object sensor 410 and senses the speed and distance of the driver's own vehicle using the driver's own vehicle sensor 420, and outputs sensing signals to the control unit 500.

When the control unit 500 receives the sensing signals indicative of data of the driver's own vehicle and data of the object output from the sensing unit 400, the control unit 300 compares the data of the driver's own vehicle to the data of the object. In the above state, the control unit 300 calculates a relative speed between the driver's own vehicle and the object. When the relative speed is equal to or higher than a reference value and the distance between the driver's own vehicle and the object is equal to or lower than a reference value, the control unit 300 outputs deploying signals to respective inflators 100 just before the driver's own vehicle collides with the object.

In the above state, the control unit 500 outputs deploying signals to respective inflators 100 with a time interval such that the first airbag cushion 210 can be deployed prior to the second airbag cushion 220. Thus, in response to the deploying signals output from the when control units 500, airbag gas is supplied to the gas distributor 600 of the first airbag cushion 210 prior to the gas distributor 600 of the second airbag cushion 220.

When the airbag gas is supplied to the gas distributor 600 by operation of the inflator 100, the airbag gas can be evenly distributed to the partitioned chambers 201 of the airbag cushion 200 through the gas distributing holes 610 of the gas distributor 600. In the above state, the airbag gas can be efficiently supplied to the terminal end inside the airbag cushion 200 through the deploying guide 620, so that the airbag cushions 200 can be evenly deployed in front of the vehicle just before the vehicle collides with an object.

For convenience in explanation and accurate definition in the appended claims, the terms "upper", "lower", "front" and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An exterior airbag for vehicles, comprising:
   a plurality of airbag housings mounted adjacent a bumper of a vehicle;
   a plurality of airbag cushions received in the respective airbag housings so as to be deployed forward from of the bumper;
   a plurality of partitioned chambers defined in each of the airbag cushions along a longitudinal direction of each airbag cushion, with a plurality of gas supply holes formed in respective partitioned chambers so as to evenly supply airbag gas to the chambers; and
   at least one inflator providing airbag gas to each of the airbag cushions through the gas supply holes;
   wherein at least one of the airbag cushions is provided with a gas guide passage, which longitudinally extends through the airbag cushion, with a gas distributor inserted into the gas guide passage and connected to the inflator and provided with a plurality of gas distributing holes corresponding to the gas supply holes.

2. The exterior airbag for vehicles according to claim 1, wherein the partitioned chambers are divided in at least one of the airbag cushions by a plurality of partition walls arranged in the airbag cushion at intervals along a longitudinal direction, with a gas control hole formed in each of the partition walls for controlling a flow of the airbag gas between the partitioned chambers.

3. The exterior airbag for vehicles according to claim 1 wherein the gas distributing holes have diameters, which are gradually enlarged in a direction, along which the airbag gas flows in the airbag cushion.

4. The exterior airbag for vehicles according to claim 1, wherein the gas guide passage is provided at an end thereof with an end hole for supplying the airbag gas to a terminal end of the airbag cushion, with a deploying guide provided in the end of the gas guide passage so as to connect an end of the gas distributor to the end hole.

5. The exterior airbag for vehicles according to claim 1, wherein, when the airbag cushions are fully deployed, neighboring sides of the airbag cushions overlap each other, thus forming an overlapping part, so that the airbag cushions encircle the front surface of the bumper.

6. The exterior airbag for vehicles according to claim 5, wherein the airbag housings are provided one opposite sides of the bumper; and the airbag cushions comprise:
   a first airbag cushion received in the airbag housing provided in a first end of the bumper such that a side of the first airbag cushion covers a central area of the front surface of the bumper when the airbag cushions are deployed; and
   a second airbag cushion received in the airbag housing provided in a second end of the bumper such that a side of the second airbag cushion covers the side of the first airbag cushion when the airbag cushions are deployed.

7. The exterior airbag for vehicles according to claim 6, wherein each of the first and second airbag cushions is provided with embossments protruding forwards from a front of the vehicle, and, when the first and second airbag cushions are deployed, the neighboring sides thereof form inclined surfaces, which face each other and form the overlapping part.

8. The exterior airbag for vehicles according to claim 5, further comprising:
   a sensing unit for sensing a speed and a distance of a driver's own vehicle and a speed and a distance of an object and outputting sensing signals; and
   a control unit for determining using the sensing signals whether the driver's own vehicle is in a state just before a collision with the object or not and outputting airbag cushion deploying signals.

9. The exterior airbag for vehicles according to claim 8, wherein the control unit outputs the airbag cushion deploying signals with a time interval such that a rear one of the airbag cushions can be deployed prior to a front one of the airbag cushions, which forms the overlapping part in cooperation with the rear airbag cushion.

* * * * *